United States Patent [19]

Anderson et al.

[11] Patent Number: 4,830,828

[45] Date of Patent: May 16, 1989

[54] METHOD FOR INHIBITING SULFIDE STRESS CORROSION CRACKING AND HYDROGEN INDUCED STEPWISE CRACKING

[75] Inventors: Kevin W. Anderson, Columbus; Henry J. Cialone, Upper Arlington, both of Ohio

[73] Assignee: Battelle Memorial Institute, Columbus, Ohio

[21] Appl. No.: 96,941

[22] Filed: Sep. 21, 1987

Related U.S. Application Data

[63] Continuation-in-part of Ser. No. 910,587, Sep. 23, 1986, abandoned.

[51] Int. Cl.$^4$ .............................................. C23C 22/00
[52] U.S. Cl. ........................................ 422/7; 210/698; 252/387; 252/388; 252/393; 252/396; 422/13; 435/262; 435/317.1
[58] Field of Search ...................... 422/7, 13; 252/387, 252/388, 393, 396; 210/698; 435/262, 317.1

[56] References Cited

U.S. PATENT DOCUMENTS 3,585,069 6/1971 Owsley ............................... 422/7 X
4,618,348 10/1986 Hayes et al. ............................ 44/51

FOREIGN PATENT DOCUMENTS 51-46744 12/1976 Japan ..................................... 422/7

OTHER PUBLICATIONS

ZoBell, "Ecology of Sulfate Reducing Bacteria," Producers Monthly, May 1958, pp. 12–29.

*Primary Examiner*—Barry S. Richman
*Assistant Examiner*—Jill Johnston
*Attorney, Agent, or Firm*—Klaus H. Wiesmann

[57] ABSTRACT

A method for inhibiting sulfide stress corrosion cracking and hydrogen induced stepwise cracking in a metal (e.g. pipeline steel) that comprises contacting the metal at a pH of 5.3 or below with an effective inhibiting amount of a glycolipid-containing product obtained from a fermentation using *Torulopsis bombicola*.

19 Claims, 1 Drawing Sheet

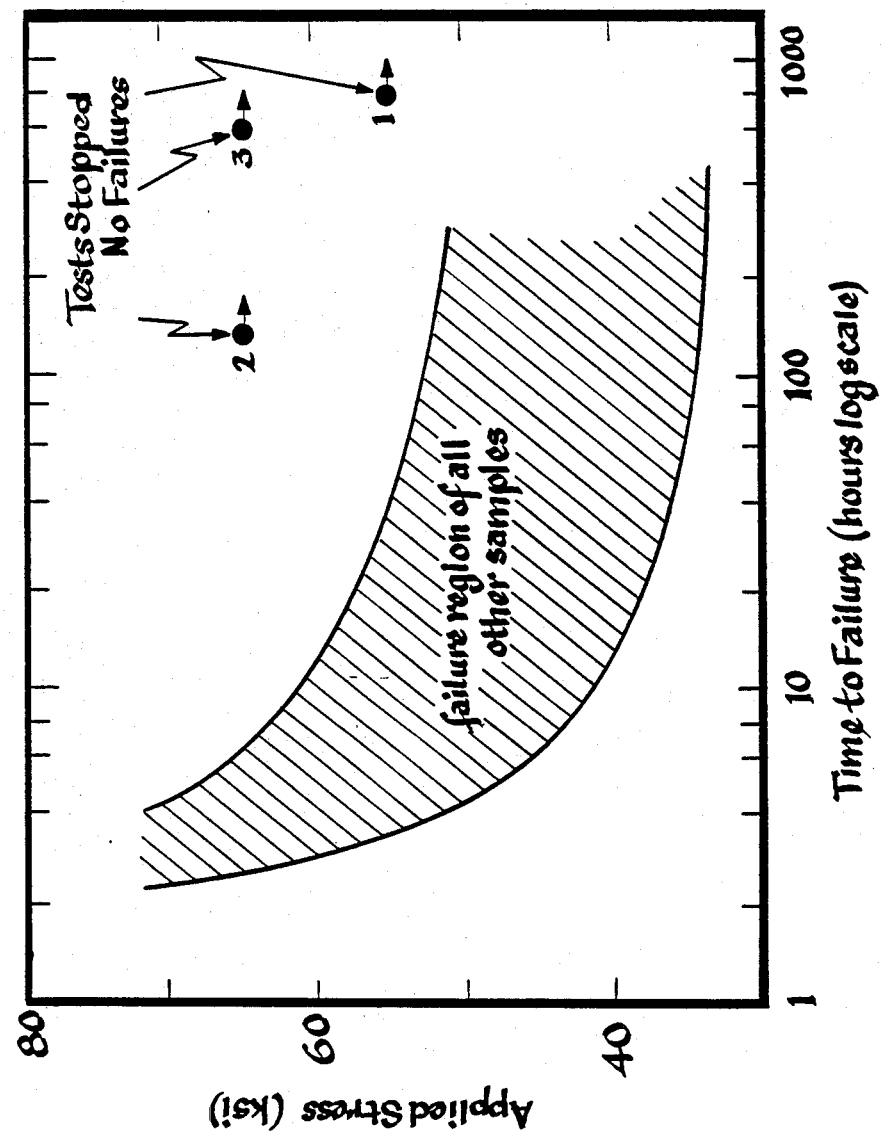

METHOD FOR INHIBITING SULFIDE STRESS CORROSION CRACKING AND HYDROGEN INDUCED STEPWISE CRACKING

This application is a continuation-in-part of application Ser. No. 910,587, filed Sept. 23, 1986, now abandoned.

FIELD OF THE INVENTION

A method is provided for inhibiting sulfide stress corrosion cracking (SSC) as well as hydrogen induced cracking (HIC) in metals. The method is particularly useful in pipelines transporting materials such as natural gas or crude oil that contain water, hydrogen sulfide and carbon dioxide.

BACKGROUND OF THE INVENTION

Stress and corrosion acting alone can reduce the service life of metals. There are circumstances, however, where the combined effects of these two factors is greater than the total of the factors acting alone. Particular practical problems are presented where a metal as in a pipeline is stressed and simultaneously subjected to the action of a corrosive medium such as aqueous hydrogen sulfide. The terms associated with these conditions are sulfide stress cracking (SSC) and hydrogen induced stepwise cracking (HIC). Sulfide stress cracking (SSC) is synonymous with sulfide stress corrosion cracking (SSCC).

In pipelines transporting natural gas, the gas often is accompanied by water, sand $H_2S$, $CO_2$, and other impurities, particularly near the well head; natural gas containing significant concentrations of $H_2S$ is referred to as sour gas. Efforts are made to dewater the gas and remove hydrogen sulfide before the gas enters the transmission pipeline, but these are not always successful. Hydrogen sulfide dissolved in the water forms a weak acid, which corrodes the metal at the internal surface of the pipe. The presence of $CO_2$ reduces the pH of the solution to approximately 3, aggravating the corrosion problem and breaking down any protective films that may form during the corrosion reaction. During the corrosion reaction, atomic hydrogen is evolved at the pipe surface, and some of the hydrogen is absorbed by the metal. Depending on the condition of the metal and the concentration of hydrogen absorbed, SSC and/or HIC may occur. A similar situation exists for sour crude oil, which contains similar impurities. Crude oil also contains various impurities, including suspended solids, water, and sulfur. Even after some purification, where water and other impurities are removed, sufficient impurities that are detrimental to the pipeline may remain.

SSC and HIC usually are accompanied by minimal material loss as a result of the corrosion reactions. The problem of HIC typically is manifested by the formation of internal cracks and/or surface blisters, which may link up through the pipe wall and lead to a leak in the line. The cracks and blisters form as the result of a buildup of high hydrogen-gas pressures at internal interfaces in the steel, and no external stress is required for HIC to occur. In contrast, SSC involves the interaction of hydrogen in the steel with stress (residual stress and applied service stress), and can result in the development of a delayed, brittle failure in the line. When sulfide stress cracking (SSC) occurs, the cracking often is associated with welds or localized regions of elevated hardness and residual stress. Both HIC and SSC are serious problems in sour-gas and sour-oil applications; however, the consequences of SSC may be more severe.

The pipeline industry has made various efforts at controlling SSC and HIC in sour service. Sour service is the term commonly used to denote service in the presence of hydrogen sulfide. The most common approaches have been to remove water and hydrogen sulfide from the gas or oil and to use inhibitors in the line, usually by applying with a rubber pig and then replenishing by adding them at various entry points in a batch process. Internal coatings have not been used extensively, presumably because any breach in the coating would lead to accelerated localized corrosion. One method that has met with limited success is the development of steels that form protective films during the corrosion reactions. Typical film-forming alloys contain approximately 0.25 percent Cu; however, when the pH of the environment drops to about 3.5, such as when significant $CO_2$ is present, the protective film formed by these steels becomes unstable. In addition, the use of low-sulfur steels with inclusion-shape control provides improved resistance to HIC only. A more costly alternative is the use of internal polymeric liners; such liners have been used only to a limited extent.

While removal of water and the use of inhibitors appear to represent the current state of the art in controlling SSC and HIC, there is room for improvement. Some instances of failure in sour environments have occurred when inhibitors reportedly were being used. This experience may indicate that the method of application of the inhibitors provides incomplete coverage of the internal surfaces of the pipeline, possibly as a result of limited dispersion of the inhibitor in the carrier. Also, currently used inhibitors are flammable and/or explosive, and may be highly toxic. Thus, there is a need for a nonflammable, nonexplosive, and nontoxic inhibitor with improved dispersion properties, better adherence to metals, and which will inhibit the corrosion reactions that lead to SSC and HIC in sour service. The present invention appears to satisfy all of these criteria.

Additional background material on corrosion may be found in the book *Marine and Offshore Corrosion* by Kenneth A. Chandler, Butterworths, London, 1985 and in the book *Corrosion Engineering*, 2nd Edition by Mars G. Fontana and Norbert D. Greene, McGraw Hill, N.Y., 1978. Paper No. 240, Initiation and Propagation Morphology of Sulfide Stress Corrosion Cracking at Welds in Linepipe Steels, by K. Ume et al, presented at Corrosion 85, The International Corrosion Forum, Mar. 25–29, 1985, Boston, Massachusetts, and Paper No. 160, Sulfide Stress Corrosion Cracking of Linepipe, by M. Kimura et al, presented at Corrosion 86, The International Corrosion Forum, Mar. 17–21, 1986, Houston, Texas, provide updated discussions of sulfide stress cracking in pipelines.

BRIEF DESCRIPTION OF THE DRAWING

The Drawing illustrates the improved degree of protection afforded by the glycolipid against sulfide stress corrosion compared to samples that were not protected.

DETAILED DESCRIPTION OF THE INVENTION

Production of the Glycolipid

Glycolipids produced by a fermentation process have been found surprisingly useful in inhibiting sulfide stress cracking. The production of these glycolipids (also referred to a sophorolipids) by *Torulopsis bombicola* (*T. bombicola*) [formerly *Torulopsis apicola*, (Spencer, Gorin, and Tulloch, 1970); formerly *Torulopsis magnolia* (Tulloch, Hill, and Spencer, 1967)] is well known in the art [U.S. Pat. Nos. 4,201,844; 3,312,684; 3,445,337; 3,205,150; J. F. T. Spencer et al, Canadian Journal of Chemistry, 39, 846, (1961); David Paddock, "Surface Activity of Torulopsis Species", Thesis, McGill University, Montreal, Canada, December, 1982]. The best yield of glycolipids are obtained by the simultaneous fermentation of a carbohydrate source and a suitable fatty acid source using a stationary phase culture of *T. bombicola*. Suitable carbohydrates include glucose, sucrose, raffinose, and fructose. Suitable fatty acid sources include fats and oils, alkanes, alkenes, and fatty acids all preferably with chain lengths in the range from $C_{16}$ to $C_{22}$. Other nutrient salts may be added. The temperature should be between 20 C and 35 C and preferably in the range from 22 C to 25 C and pH in the range from 3.5 to 4.5.

An equilibrium mixture of the crude product containing glycolipid is initially recovered from the fermentation tanks by spontaneous phase separation. This separation may be aided by heating. Following fermentation the unreacted fatty acid sources (corn oil, tallow, etc.) will be on top of the aqueous phase. The crude product separates to the bottom of the fermentation vessel, below the aqueous phase, with some glycolipid remaining in the aqueous phase. The crude product that separates to the bottom is about 45 percent glycolipid and 55 percent water and will contain various impurities including unreacted fatty acid sources. This crude equilibrium mixture from the fermentation was applied in Examples 1 and 2. The glycolipid can be purified by known methods such as extraction with hexane to remove unreacted fatty acid sources. This latter mixture was used in Example 3.

As used herein the terms glycolipid produced by *T. bombicola* and surfactant produced by *T. bombicola* refer to the same material, which may be in the form of crude product or crude product that has been purified of fatty acids by solvent extraction; both forms of the product contain approximately equal parts water and glycolipid. The glycolipids thus produced are a mixture of glycosides consisting of a 2-0-β-D-glycopyranosyl-D-glucopyranose unit linked 1-β-glycosidically to the terminal or penultimate carbon residue of fatty acids having variable chain length usually in the range from $C_{13}$ to $C_{18}$ and variable degrees of saturation. While these are the predominant chain lengths expected, longer chain lengths are possible and have been reported in the literature. Use of these longer chain length molecules is contemplated in the invention. The disaccharide moiety may be acetylated in the $C_6$ position of either or both glucopyranosyl units. The glycolipids may exist in a free acid form or as a macrocyclic lactone. See Formulas I and II below:

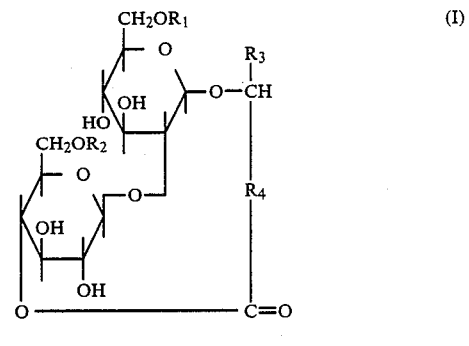

and

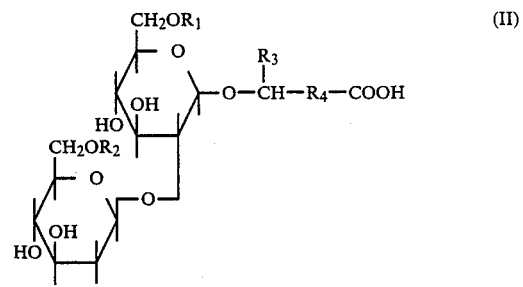

where $R_1 = COCH_3$ or H
$R_2 = COCH_3$ or H
$R_3 = CH_3$ or H
and $R_4$ = a saturated or unsaturated hydrocarbon group having 11 to 15 carbon atoms.

The glycolipids are mixed in a composition which may be: The original crude product, the mixture of glycolipid and a fluid to be transported or the mixture of the glycolipid and a carrier useful for lubrication, cooling or heating.

Although the production of the glycolipid described is well-known, its value as an inhibitor of sulfide stress corrosion cracking (SSC) or hydrogen induced cracking is not known. The discovery that the glycolipid gives excellent protection against these two forms of failure was surpirising and unexpected. The invention thus proposes to use this known glycolipid in a new and unobvious way.

Further description of the microorganism and production conditions may be obtained from: Spencer, J. F. T., P. A. J. Gorin, and A. P. Tulloch, "*Torulopsis bombicola* sp. n", *Antonie van Leeuwenhoek J. Microbial. Seral.*, 36: pp. 129-133, 1970. Tulloch, A. P., A. Hill, and J. F. T. Spencer, "A New Type of Macrocyclic Lactone from *Torulopsis apicola*", *Chemical Communication*, p. 584-586, 1967. Cooper, D. G., and D. A. Paddock, "Production of a Biosurfactant from *Torulopsis bombicola*", *Applied and Environmental Microbiology*, 47 pp. 173-176, 1984.

Experimental

Standard experiments to evaluate the SSC resistance of materials for sour service were performed with specimens that were protected by the microbial surfactant and compared with data for unprotected specimens that were tested previously. The experimental procedure is covered by National Association of Corrosion Engineers (NACE) Standard TM-01-77, "Testing of Metals for Resistance to Sulfide Stress Cracking at Ambient Temperatures". The procedure involves exposing tensile specimens under constant load to a severe sour environment consisting of an H₂S-saturated aqueous NaCl solution, to which glacial acetic acid is added to adjust the initial pH to 3, and determining the time to failure as a function of applied stress. Materials that require longer periods of time to fail at a given stress level generally are judged to be slightly more resistant to SSC. More importantly, materials that exhibit a higher threshold stress for SSC, which is the stress below which SSC is not observed for any period of time, generally are judged to be significantly more resistant to SSC. A wide range of materials has been evaluated by the procedures outlined in NACE Standard TM-01-77.

Three specimens of pipe steel were tested. Those specimens were tensile bars with a ¼" diameter reduced section containing a production seam weld. The specimens were prepared from an API 5L Grade X70 steel pipe, with a minimum specified yield strength of 70 ksi, which has been evaluated without a glycolipic coating. The specimens were hand polished in the reduced section through 600 grit silicon carbide abrasive paper. Each specimen was mounted in a glass cell sealed with neoprene sheet gaskets. Specimens 1 and 2 were first coated with the crude product from fermentation containing the glycolipid, while Specimen 3 was not coated. The specimens were put in uniaxial tensile loading fixtures and the standard NACE SSC solution containing approximately 1 percent of the glycolipid inhibitor was added to each cell. The solution then was deaerated for about 20 minutes using dry nitrogen. The specimens then were loaded to the calculated load and H₂S gas was then bubbled through each cell.

EXAMPLES 1 AND 2

To evaluate the effectiveness of the glycolipid in inhibiting SSC, two experiments at applied stresses of 55 ksi (Sample 1) and 65 ksi (Sample 2) were performed with specimens from the X70 pipe. Numerous similar materials, including the steel used to evaluate the microbial surfactant, have been characterized with the NACE procedure and have exhibited failures within approximately 100 hours and 10 hours, respectively, at those applied stresses. However, with the application of the microbial surfactant to the specimen surfaces, the specimens did not fail; the 55-ksi test was terminated after 880 hours and the 65-ksi test was terminated after 140 hours. The Table and the Drawing illustrate these results.

TABLE
MATERIAL API-5L X70 PIPE STEEL

| | | Applied Stress | | |
|---|---|---|---|---|
| Specimen | Time (Hours)$^{(a)}$ | ksi | % Yield Strength | Final pH |
| 1 | 880 | 55 | 61 | 2.65 |
| 2 | 140.2 | 65 | 72 | 2.8 |
| 3 | 573 | 65 | 72 | <4.5 |

$^{(a)}$Test stopped without failure.

The crosshatched area of the Drawing indicates the region where previous tests have fallen for uncoated samples. The two data points from Examples 1 and 2 are plotted for the time at which the tests were intentionally stopped and no failure occurred. Had the tests continued it is expected that the results would have been even better in that they would have been further to the right on the time scale (see the drawing figure). The dramatic increase in specimen life resulting from the use of the glycolipid in the method of the invention was surprising and unexpected.

EXAMPLE 3

A third experiment was performed with another specimen from the same welded pipe used in Examples 1 and 2. In this experiment, the microbial surfactant was not applied to the surface of the specimen, but was only added to the test solution; the amount of the product (containing approximately equal parts water and glycolipid) added made up 1 percent of the solution volume. The specimen was loaded in tension at a stress of 65 ksi. The specimen did not fail, and the test was intentionally stopped after 573.1 hours. This example demonstrates the ease of use of the invention, since direct application of a coating of the surfactant onto the metal is not needed. Results are shown in the Table and the Drawing.

Discussion

The glycolipid is expected to be a useful inhibitor of sulfide stress cracking (SSC), as well as of hydrogen induced stepwise cracking (HIC) in sour environments. Although evaluations only were performed for sulfide stress cracking it is expected that the glycolipid will perform similarly to prevent hydrogen induced cracking. This is because HIC occurs as a result of atomic hydrogen that is generated during corrosion reactions, similarly to the manner in which hydrogen is developed during SSC. The surfactant appears to prevent the corrosion reactions which generate the hydrogen and thereby protect the metal from SSC.

While Examples 1 and 2 illustrate coating of a metal to be protected with the glycolipid concurrent with the addition of glycolipid to the standard NACE SSC solution, the coating step is optional. The preferred method of practicing the invention is to mix an effective amount of glycolipid with a fluid that is in contact with the metal. For a pipeline system the fluid could include petroleum oils, crude oils, natural gas, and similar materials. When added to the fluid the glycolipid product will, on contacting the fluid, spontaneously disperse coat the metal, and protect the metal from sulfide stress cracking and hydrogen induced cracking. The surfactant can be added at various entry points in a batch process, similar to current practice with conventional inhibitors, but with a higher degree of effectiveness.

Further additional favorable characteristics of the crude product containing glycolipid include:
 (1) it is readily dispersable in water;
 (2) it adheres to metals at pH 5.3 and below;
 (3) it is nonflammable;
 (4) it is nonexplosive; and
 (5) it has much lower toxicity compared to current inhibitors.

An effective inhibiting amount of glycolipid is the concentration of the glycolipid in a carrier or fluid that inhibits sulfide stress cracking or hydrogen induced cracking when in contact with a metal to be protected. In Examples 1 and 2 about a 2 percent concentration of crude product containing about half glycolipid and half water was found to be effective. In Example 3 about a 1 percent concentration of the half-glycolipid/half-water product, which was purified of fatty acids by extraction with hexane, was found to be effective. The net concentration of glycolipid was 1 percent in Examples 1 and 2 and ½ percent in Example 3. Lower amounts of the glycolipid are expected to be useful. The effective amount will vary with the metal to be protected and with the type of fluid in contact with the metal. The most efficient effective amount should be easily determinable by those skilled in the art once knowing the teachings of the invention.

A crude product of the fermentation process is all that is expected to be needed for most applications (e.g. in pipeline service) with only some specialized applications (e.g. where high tolerance or technical machining is involved) requiring a purified form of the glycolipid. One or more extractions with hexane will provide a purified glycolipid inhibitor. This purification removes unreacted oils, in which the glycolipid is essentially nonsoluble.

The glycolipids produced by *T. bombicola* are water-insoluble in the pH range below about 5.3. For example, at pH 4.0 the solubility of the glycolipids in water are less than 10 ppm. This property is in fact exploited in the recovery of the glycolipid from the fermentation mixture where the crude glycolipid separates to the bottom of the fermentation vessel. It is below this pH level where sulfide-stress cracking in sour gas or oil is the most severe. In the pH range above 5.3 the glycolipid becomes more polar and is water soluble. For example, at pH 5.6 the solubility of glycolipid in water is over 10,000 ppm. Sulfide-stress cracking becomes less of a problem in this pH range.

A low pH results in accelerated attack of steel by the mechanisms discussed herein, primarily as a result of the breakdown of protective films. However, a low pH also causes the glycolipid to be insoluble in water, thus favoring the coating of the metal by the glycolipid. Therefore, the application of the glycolipid to inhibit SSC and HIC is limited to the pH range below 5.3 for pipelines transporting sour oil or sour gas.

Although the examples illustrate the protection of API-5L X70 pipe steel only, the method should be applicable to other metals commonly used in pipelines. These include lower strength carbon-manganese steels, such as API-5L X42, X52 and X60, as well as other microalloyed steels such as API-5L X60 and X65.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method for inhibiting sulfide stress corrosion cracking and hydrogen induced stepwise cracking in a metal comprising: contacting the metal at a pH of 5.3 or below with an effective inhibiting amount of a glycolipid-containing product obtained from a fermentation using *Torulopsis bombicola*.

2. The method of claim 1 wherein the metal contacted is steel.

3. The method of claim 1 wherein the glycolipid-containing product is further purified to remove unreacted fatty acid sources prior to contacting the metal.

4. The method of claim 1 whereby the glycolipid-containing product is first mixed with a fluid that is in contact with the metal.

5. The method of claim 4 wherein the glycolipid-containing product mixed with the fluid is a crude product obtained from fermentation of *Torulopsis bombicola*.

6. The method of claim 5 wherein the metal to be contacted is steel.

7. The method of claim 6 wherein the fluid mixed with the glycolipidcontaining product is transported by a pipeline.

8. The method of claim 4 wherein the fluid is natural gas.

9. The method of claim 4 wherein the fluid is crude oil.

10. A method for inhibiting sulfide stress corrosion cracking and hydrogen induced stepwise cracking in a metal comprising: contacting the metal at a pH of 5.3 or below with an effective inhibiting amount of a composition containing an inhibitor that is a mixture of glycolipid compounds obtained from a fermentation using *Torulopsis bombicola* that are represented by formulas (I) and (II);

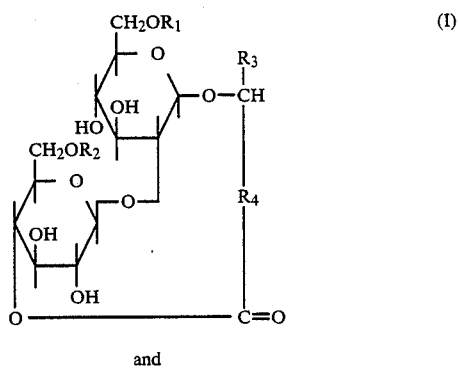

and

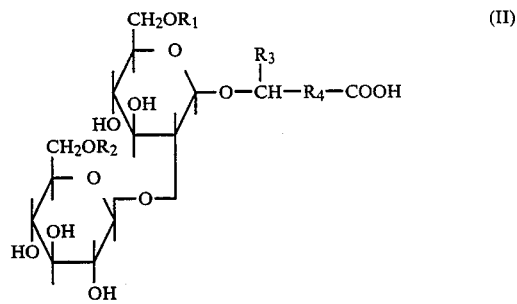

where $R_1$ = COCH$_3$ or H
$R_2$ = COCH$_3$ or H
$R_3$ = CH$_3$ or H
and $R_4$ = a saturated or unsaturated hydrocarbon group having 11 to 15 carbon atoms.

11. The method of claim 10 wherein the metal contacted is steel.

12. The method of claim 10 wherein the glycolipid is further purified to remove unreacted fatty acid sources prior to contacting the metal.

13. The method of claim 10 whereby the composition is first mixed with a fluid that is in contact with the metal.

14. The method of claim 13 wherein the composition mixed with the fluid is the crude product obtained from fermentation of Torulopsis bombicola.

15. The method of claim 14 wherein the metal to be contacted is steel.

16. The method of claim 15 wherein the fluid mixed with the composition is transported by a pipeline.

17. The method of claim 13 wherein the fluid is natural gas.

18. The method of claim 13 wherein the fluid is crude oil.

19. The method of claim 13 wherein the fluid is a carrier useful for lubrication, cooling or heating.

* * * * *